United States Patent
Persson

(10) Patent No.: US 7,450,843 B2
(45) Date of Patent: Nov. 11, 2008

(54) OPTICAL COMMUNICATION SYSTEM WITH TWO PARALLEL TRANSMISSION PATHS

(75) Inventor: Ulf A. Persson, Skogås (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 575 days.

(21) Appl. No.: 10/240,528

(22) PCT Filed: Feb. 21, 2001

(86) PCT No.: PCT/EP01/01975

§ 371 (c)(1),
(2), (4) Date: Apr. 3, 2003

(87) PCT Pub. No.: WO01/78268

PCT Pub. Date: Oct. 18, 2001

(65) Prior Publication Data

US 2003/0156845 A1    Aug. 21, 2003

(30) Foreign Application Priority Data

Apr. 5, 2000    (EP) .................................. 00107415

(51) Int. Cl.
*G02F 1/00*    (2006.01)
*H04B 10/00*    (2006.01)
*H04J 14/00*    (2006.01)
*G02B 6/42*    (2006.01)

(52) U.S. Cl. .................. 398/5; 398/4; 385/27
(58) Field of Classification Search .......... 398/4, 398/5, 149, 59; 385/27
See application file for complete search history.

(56) References Cited

U.S. PATENT DOCUMENTS

| | | | | |
|---|---|---|---|---|
| 5,253,104 A | * | 10/1993 | Delavaux | 359/341.33 |
| 5,396,357 A | | 3/1995 | Goossen et al. | 359/119 |
| 5,901,260 A | * | 5/1999 | Braun | 385/24 |
| 6,359,728 B1 | * | 3/2002 | Angellieri et al. | 359/345 |
| 6,414,768 B1 | * | 7/2002 | Sakata et al. | 398/59 |
| H2075 H | * | 8/2003 | Gnauck et al. | 398/58 |
| 6,760,151 B1 | * | 7/2004 | Vail et al. | 359/341.3 |
| 6,947,670 B1 | * | 9/2005 | Korotky et al. | 398/59 |

FOREIGN PATENT DOCUMENTS

| | | |
|---|---|---|
| JP | 05 060930 | 3/1993 |
| WO | WO 98/52314 A2 | 11/1998 |
| WO | WO 98/52314 A3 | 11/1998 |
| WO | WO 99/65165 | 12/1999 |
| WO | 01/01975 | 7/2001 |

* cited by examiner

*Primary Examiner*—Shi K. Li
*Assistant Examiner*—Nathan Curs

(57) ABSTRACT

In an optical communication link a first node (30) with transmission means (50) and a second node with receiving means (40) are connected by at least two optical fiber transmission paths (100,200). One path serves as the working path, while the remaining path or paths serve as protection paths. The transmission means in the first node is connected to an optical signal power splitter (60) which couples the signal power from the transmitting means unequally into the different transmission paths. This uneven coupling of signal power imposes greater losses in one path than in the other or others. By arranging the splitter to couple a higher proportion of the transmitted optical power into the path that has the highest inherent losses the additional loss imposed on this path is reduced. Thus the maximum path loss between any two nodes can be minimized. This in turn means that the link length and also the size of the network is virtually unaffected by using the same transmitter.

15 Claims, 1 Drawing Sheet

OPTICAL COMMUNICATION SYSTEM WITH TWO PARALLEL TRANSMISSION PATHS

This application is the national phase under 35 USC 371 of PCT International Application No. PCT/EP01/01975 filed on 21 Feb. 2001, which designated the Untied States of America.

FIELD OF INVENTION

The invention is broadly directed to optical transmission systems. It has particular relevance to optical systems with failure protections arrangements.

BACKGROUND ART

Optical communication systems presently carry large amounts of data. A fibre break or other interruption along a line can thus potentially affect multiple services. In order to restore these services with the minimum of delay, the network must rerout the traffic via an alternative path. This is accomplished in the SONET/SDH system by electrically switching and routing traffic signals in every node. When a fiber break or other disturbance is detected which prevents transmission over a particular link, the nodes can be reconfigured to switch traffic signals via alternative nodes.

However, for WDM systems and more generally for optical networking, where multiple protocols, such as IP, ATM, Gigabit Ethernet and the like, coexist with SONET/SDH systems, electrical switching in each node is not practicable.

Such networks are therefore typically configured with at least one alternative path formed by a separate direct optical link between the nodes in a network. The alternative path is commonly called a protection path. If information does not arrive via the first path or working path, transmission is switched to the alternative path. For total protection, complete redundancy is required, with the fill link including transmitters and receivers duplicated. However, such an arrangement is naturally very costly, particularly for WDM systems as multiple transmitters are required for each path. Moreover, for many applications the degree of protection assured by fill redundancy is not needed.

A reduction in cost is obtained if a single transmitter is used for both the working and protection paths. This may be achieved by providing a switch to control the connection between the two paths and the single transmitter. However in operation, information about a failure in one path must be obtained and relayed to the switch control.

The need for switching may be overcome by dividing the signal power from the transmitter equally between the two paths using a splitter. However the division of power in this way will impose a 3 dB loss on each path, in addition to the loss in the splitter itself. These additional losses reduce the possible transmission distance without amplification. Fiber losses are typically of the order of 0.25 dB/3 km. Imposing a power reduction of 3 dB on a path effectively shortens the possible link distance by around 12 km.

SUMMARY OF INVENTION

It is an object of the present invention to provide an optical communication system that overcomes the disadvantages of prior art systems.

It is a further object of the present invention to provide an optical communication system that maximises the transmission distance between nodes and is inexpensive to implement.

It is a still further object of the present invention to provide a network node for use in such an optical communication system that enables the optimisation of transmission distance without the duplication of transmitters.

In an optical communication link according with the present invention a first node with transmission means and a second node with receiving means are connected by at least two optical fiber transmission paths in parallel. One path serves as the working path, while the at least one further path is configured as the protection or standby path. The transmission means in the first node is connected to the parallel transmission paths via an optical signal power splitter which divides the signal power from the transmitting means unequally between the transmission paths.

This uneven coupling of signal power effectively imposes greater losses in one path than in the other or others. The splitter can thus be arranged to couple a higher proportion of the optical power received from the transmitter into the path that has the higher inherent losses and so reduce the additional loss imposed on this path. The other path or paths will then be subjected to a greater additional signal power loss. However, since the remaining path or paths have a lower inherent loss, they are better able to tolerate a larger proportion of the additional loss.

Accordingly, by appropriate selection of the splitting ratio and appropriate arrangement of the splitter, the maximum path loss between any two nodes can be minimized. This in turn means that the link length and also the size of the network is virtually unaffected by using the same transmitter.

Preferably, the splitting ratio of the splitter is selected to substantially equalises the signal power received through each optical fiber path. However, this is not obligatory. Instead, a network may comprise only splitters with a limited number of different splitting ratios arranged to distribute the path loss more uniformly, but not necessarily equally between different paths between network nodes.

In a preferred embodiment of the invention, the splitter has an adjustable splitting ratio such that the ratio of signal powers coupled into different paths may be changed to take account of modifications in a link or the effects of ageing. The splitter is then adjustable such that the signal power coupled into each path results in the losses on each path being substantially equal.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
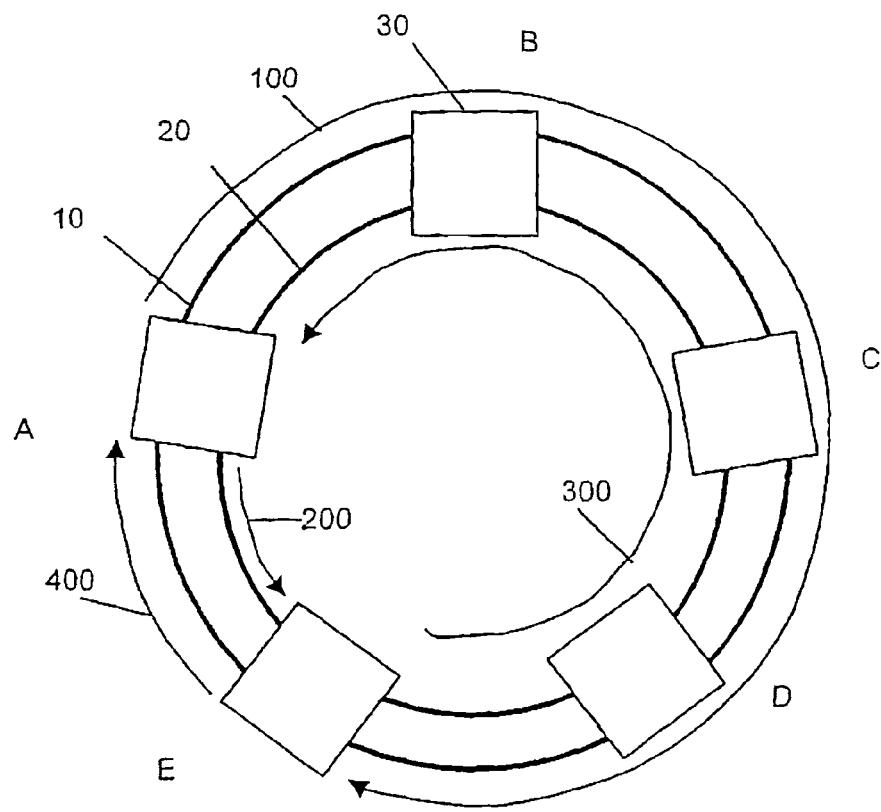
FIG. 1 schematically depicts an optical communication network.

FIG. 1 shows an optical communications network consisting of a plurality of nodes 30. The nodes are connected in a ring by two transmission paths 10, 20 formed by optical fibres. The nodes 30 have been labelled A, B, C, D and E in the figure. Each transmission path 10, 20 is unidirectional. As indicated by the arrows, data carried on transmission path 10 flows in a clockwise direction around the ring, while the flow of data on transmission path 20 is in an anticlockwise direction. The network is carrying wavelength division multiplexed (WDM) signals, possibly in parallel with other traffic services.

Figure 2:
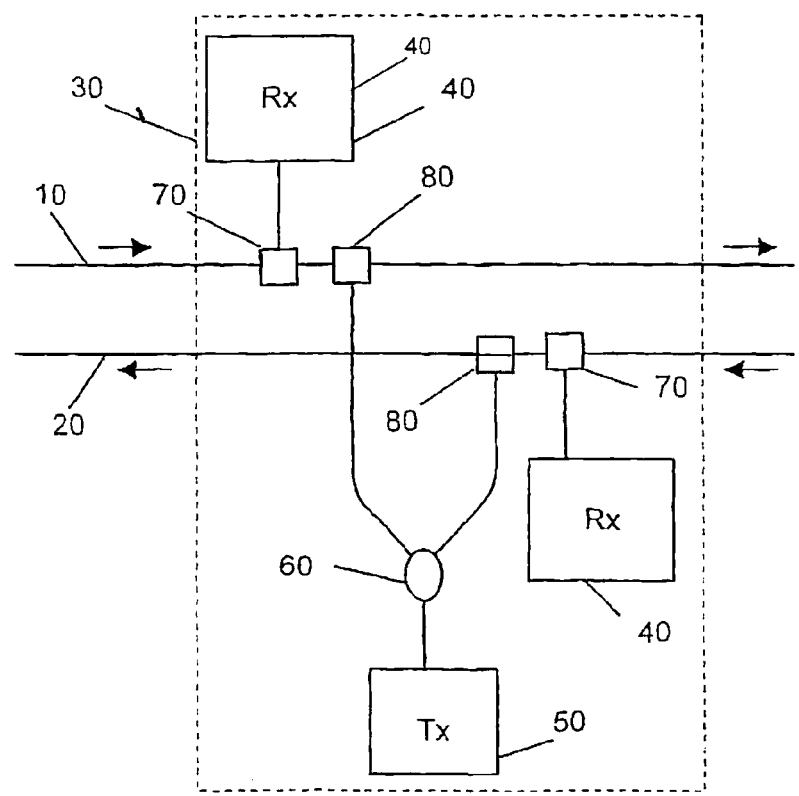
FIG. 2 schematically illustrates part of a network node in accordance with the present invention for use in the network of FIG. 1.

Turning now to FIG. 2 a portion of a network node 30 is illustrated. The node 30 includes two receivers 40 each coupled to one of the fibres 10, 20 by an optical coupler 70. The optical coupler 70 is preferably of a type incorporating a filter for filtering out the wavelength or waveband destined to be received by the node 70. Such couplers are generally known in the art and commercially available and will not be described in more detail here. Signals at all other wavelengths are allowed to pass through the node 30. It will be understood that the pair of couplers 70 in a node are substantially identical as they will be carrying the same traffic services. The same is true for the receivers 40. The receivers 40 are preferably connected to a control processor (not shown) which determines which of the two paths is currently operating as the working path. The node 30 further includes a single transmitter arrangement 50 that is connected to both optical fibres 10, 20. This connection is achieved with an optical power splitter 60 which is coupled to a single fiber carrying the transmitted signals and divides the transmitted signal power between two fibres. Each of these two fibres is then connected to one of the two separate optical fiber paths 10, 20 via a respective coupler 80. The couplers 80 are naturally designed to add the same wavelengths or wavelength bands as the couplers 70 are designed to drop. While only one add 80 and one drop coupler 70 have been illustrated for each node, it will be understood that other filter components of couplers may be connected to the fibres 10 and 20 in the nodes 30. This is particularly the case when several channels are dropped in a node or different traffic services utilise the same network. For example when a SONET/SDH system exists in parallel with a WDM system, other add drop couplers may filter out SONET traffic separately. Service channels carried by the fibres 10, 20, for example as a pilot tone, may also require separate filtering.

It will be understood that FIG. 2 shows only a schematic representation of part of a node 30. The remaining elements of the node are well known in the art and will not be discussed in further detail.

Returning now to FIG. 1 it can be seen that the fibres 10 and 20 can serve as two separate transmission paths. For example, when traffic is sent from node A to node E it may be routed through a working path on fiber 10 indicated by arrow 100, or on a protection path through fiber 20 indicated by arrow 200. The traffic from node E to node A is shown by arrows 300 and 400. Either path may serve as the working or protection path. It is further apparent that traffic sent on the working path 100 traverses well over half the ring through nodes B, C and D before reaching the coupler 70 of node E. Conversely the protection path 200 passes directly from node A to the coupler 70 in node E and traverses only a small segment of the ring. The two paths carry data simultaneously. The splitter 60 in node A divides the signal power from the transmitter 50 between the two paths. However the working path will have the higher power losses owing to the longer fiber length and the several add/drop couplers 70, 80 of the intermediate nodes B, C and D.

The losses on this longer path limit the total length of the link. The system requires a minimum power level at the receiver which in turn limits the maximum link loss that can be tolerated. When the signal power from the transmitter 50 in the sending node is split equally between the two paths, i.e. when the splitter 60 has a splitting ratio of 50:50, both the working and protection paths will be subjected to the same additional power loss of 3 dB when the excess losses caused by the splitter 60 itself are disregarded. This further loss shortens the possible link length still more. For example the power loss through an optical fiber is typically of the order of 0.25 dB/km. An additional loss of 3 dB thus reduces the possible fiber length, and therefore the total size of the network, by 12 km.

In accordance with the invention, the splitter 60 is chosen to substantially equalise the losses experienced on the working and protection paths 100, 200, such that the signal power received by the two receivers 40 is also substantially equal. This is achieved by dividing the signal power from the transmitter 50 unevenly between the two fibres 10, 20 using the splitter 60, such that the path that has the highest losses by virtue of its structure receives the major portion of the signal power, and thus the minor portion of additional losses. For example, it is assumed that the maximum allowed link loss supported by the system is 26 dB. The working path 100 has a link loss of 25 dB and the protection path 200 has a link loss of 5 dB. The working path can tolerate only 1 dB of additional power loss. The protection path 200, on the other hand, can tolerate an additional 21 dB of power loss. If a splitter 60 is to substantially equalise the losses through these two paths it should have a power splitting ratio of around 20 dB giving an ideal equal loss of 25.4 dB for each path. A splitter 60 with a split or coupling ratio of 1:99 would provide a satisfactory result. This should be compared with the case when a 50:50 splitter is used on this same link. The total losses in the working and protection paths 100, 200 would be 28 dB and 8 dB, respectively, which clearly exceeds the maximum permitted link loss.

The splitter 60 is preferably a fused coupler. Such couplers are generally know in the art and are commercially available with a range of different splitting ratios. However, other suitable components capable of dividing the signal power unequally between two or more paths may also be used.

In practice additional component losses imposed in splitters with a splitting ratio that is smaller than 1:99 will mean that these are not useful for most applications. Standard commercial fused couplers with a splitting ratio of 1:99 typically have a loss of less than 0.2 dB for the 99% path. In the example given above this would lead to a total loss of around 25.2 dB loss for the working path which is within the acceptable loss limit. Standard 50:50 fused couplers actually add an additional loss of around 3.4 dB. The arrangement using a 1:99 coupler thus reduces the link power for the working path by only 0.2 dB compared with a fully duplicated link having separate transmitters for each path. However, it provides a 3.2 dB increase in power compared to the arrangement using a 50:50 splitter 60.

The loss in a transmission path is calculated on installation of a system. The required splitting ratios of the splitters 60 are then selected on the basis of the calculated loss.

It will be understood that the choice of splitting ratio for the splitter 60 need not provide exactly the same loss in both the working and protection paths. For practical reasons, a network might better use splitters 60 with only very few, for example three or even two different splitting ratios. For instance in the link described above, a 1:99 splitter 60 may be used for all paths wherein the highest link loss in either the working or protection path exceeds around 21.6 dB, while for those path pairs having losses below this value, 50:50 splitters may be used.

In a preferred embodiment, the splitting ratio of the splitter 60 is adjustable. Such variable splitters are well known in the art and commercially available. The splitting ratio is controlled by means of a control signal. Preferably the power received by the receivers in the working and protection paths is monitored. Information on this received power is then relayed to the link or network management system, which in turn adjusts the splitting ratio of the variable splitter 60 to substantially equalise the power loss in the two paths. This allows the ratio of signal power to be adjusted while the system is in use. Changes in the link loss between working and protection paths resulting from system changes, such as the addition of more filters in an intermediate node, and also increasing loss due to ageing may then be compensated for as they occur.

While the invention has been discussed in relation to a ring configuration, it will be appreciated that it may equally well be applied to other configurations, such as point-to-point systems, hubbed rings, and more advanced optical networks. In some of these networks, it may be possible to provide more than one alternative path.

The invention claimed is:

1. A method, in an optical communications link including a first node having transmission means and a second node with two receiving means, the first and second node being connected by at least two optical fiber transmission paths in parallel, one path serving as a working path and another path serving as a protection path, the method comprising:
monitoring power received by the receivers, one in the working path and the other in the protection path; and
sending monitoring information on the received power to a link management system, wherein the link management system uses the monitoring information for
adjusting the splitting ratio of a variable optical signal splitter, the variable optical signal splitter coupled with the transmission means and the receiving means, to substantially equalize power loss in the working path and the protection path.

2. The method as claimed in claim 1, further comprising adjusting the variable optical signal splitter while the optical communications link is in use.

3. The method as claimed in claim 1, wherein the splitting ratio of the optical signal splitter is at most 1:99.

4. The method as claimed in claim 2, further comprising adjusting the splitting ratio of said variable splitter according to changes in link loss between the working path and protection path as the loss occurs, wherein the changes include addition of filters in an intermediate node and increasing loss due to aging.

5. An optical communications link including a first node having transmission means and a second node with two receiving means, the first and second node being connected by at least two optical fiber transmission paths in parallel, one path serving as a working path and another path serving as a protection path, the optical communications link comprising:
means for monitoring power received by the receivers, one in the working path and the other in the protection path; and
means for sending monitoring information on the received power to a link management system, the link management system having
means for adjusting the splitting ratio of a variable optical signal splitter that is coupled with the transmission means and the receiving means, wherein the splitting ratio is adjusted according to the received monitoring information to substantially equalize power loss in the working path and the protection path.

6. The optical communications link as claimed in claim 5, further comprising means for adjusting the variable optical signal splitter while the optical communications link is in use.

7. The optical communications link as claimed in claim 5, wherein the splitting ratio of the variable optical signal splitter is at most 1:99.

8. The optical communications link as claimed in claim 6, wherein the splitting ratio of said variable splitter is adjustable according to changes in link loss between the working path and protection path as the loss occurs, wherein the changes include addition of filters in an intermediate node and increasing loss due to aging.

9. An optical communications network including a plurality of nodes each node including a transmitter means and two receiver means, a pair of optical fibers interconnect in parallel between the transmitter means and the two receiver means to form a working transmission path between the transmitter means of a first node and the receiver means of an adjacent node on one side of the first node and at least one protection transmission path between the transmitter means of the first node and the receiver of an adjacent node on the other side of the first node, means of a second node, the optical communications network comprising:
a network management system coupled with an optical communications link, the optical communications link comprising:
means for monitoring power received by the receivers in the working path and the protection path; and
means for sending monitoring information on the received power to the network management system, the network management system further comprising
means for adjusting the splitting ratio of a variable optical signal splitter that is coupled with the transmission means and the receiving means, wherein the splitting ratio is adjusted according to the monitoring information to substantially equalize power loss in the working path and the protection path.

10. The optical communications network as claimed in claim 9, further comprising means for adjusting the variable optical signal splitter while the optical communications link is in use.

11. The optical communications network as claimed in claim 9, wherein the splitting ratio of the variable optical signal splitter is at most 1:99.

12. The optical communications network as claimed in claim 10, wherein the splitting ratio of said variable splitter is adjusted according to changes in link loss between the working path and protection path as the loss occurs, wherein the changes include addition of filters in an intermediate node and increasing loss due to aging.

13. The optical network as claimed in claim 9, wherein said plurality of nodes are connected in a ring with the working and protection paths between any two nodes transmitting in opposite directions around the ring.

14. A method for substantially equalizing signal power in two optical fiber transmission paths between a transmission node and two receiver nodes connected by optical fibers, the optical fibers comprising a working path and a protection path in parallel opposite directions between the transmission node and the receiver nodes, the method comprising the steps of:
determining which of the optical fiber paths is the working path and which is the protection path;
monitoring power received by the two receiver nodes, one in the working path and the other in the protection path;
coupling signals from transmitting means in the transmission node to the working path and the protection path utilizing an optical signal splitter having an adjustable signal splitter ratio;

utilizing the monitored power information to adjust the splitter ratio so that the difference in received power between the transmission node and each of the receiver nodes is minimized.

15. The method of claim 14, further comprising:

adjusting the ratio of the optical signal splitter so as to route a major portion of the signal power from the transmission node to either the working path or the protection path so that the signal powers from the working path and the protection path received at the receivers are substantially equal.

\* \* \* \* \*

UNITED STATES PATENT AND TRADEMARK OFFICE
CERTIFICATE OF CORRECTION

PATENT NO. : 7,450,843 B2  Page 1 of 1
APPLICATION NO. : 10/240528
DATED : November 11, 2008
INVENTOR(S) : Persson It is certified that error appears in the above-identified patent and that said Letters Patent is hereby corrected as shown below:

In Column 1, Line 21, delete "rerout" and insert -- reroute --, therefor.

In Column 1, Line 37, delete "fill" and insert -- full --, therefor.

In Column 1, Line 41, delete "fill" and insert -- full --, therefor.

In Column 1, Line 56, delete "dB/3 km." and insert -- dB/km. --, therefor.

In Column 6, Line 18, in Claim 9, delete "receiver of" and insert -- receiver means of --, therefor.

In Column 6, Line 19, in Claim 9, after "first node," delete "means of a second node,".

Signed and Sealed this

Twenty-first Day of April, 2009

JOHN DOLL
*Acting Director of the United States Patent and Trademark Office*